US006192743B1

(12) United States Patent
Perry

(10) Patent No.: US 6,192,743 B1
(45) Date of Patent: Feb. 27, 2001

(54) SELF-CONTAINED LEAK DETECTION MODULE HAVING ENCLOSURE-MOUNTED TOGGLE LEVERS FOR PUMP AND VALVE

(75) Inventor: Paul Douglas Perry, Chatham (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/253,994

(22) Filed: Feb. 22, 1999

Related U.S. Application Data

(60) Provisional application No. 60/075,953, filed on Feb. 25, 1998.

(51) Int. Cl.[7] .......................... G01M 3/32; F02M 37/04; F02M 33/02

(52) U.S. Cl. .............................. 73/40; 73/118.1; 73/49.7; 123/520; 123/516; 137/907

(58) Field of Search ............................. 73/40, 49.2, 49.7, 73/118.1; 123/520, 518, 516; 137/907

(56) References Cited

U.S. PATENT DOCUMENTS

| | | | | |
|---|---|---|---|---|
| 5,146,902 | * | 9/1992 | Cook et al. | 123/518 |
| 5,297,529 | * | 3/1994 | Cook et al. | 123/520 |
| 5,383,437 | * | 1/1995 | Cook et al. | 123/520 |
| 5,390,645 | * | 2/1995 | Cook et al. | 123/520 |
| 5,411,004 | * | 5/1995 | Busato et al. | 123/520 |
| 5,474,050 | * | 12/1995 | Cook et al. | 123/520 |
| 5,483,942 | * | 1/1996 | Perry et al. | 123/520 |
| 5,499,614 | * | 3/1996 | Busato et al. | 123/520 |
| 5,803,056 | * | 9/1998 | Cook et al. | 123/520 |
| 5,817,925 | * | 10/1998 | Cook et al. | 73/40 |
| 5,850,819 | * | 12/1998 | Kunimitsu et al. | 123/520 |
| 5,868,120 | * | 2/1999 | Van Wetten et al. | 123/518 |
| 5,878,725 | * | 3/1999 | Osterbrink | 123/516 |
| 5,957,115 | * | 9/1999 | Busato et al. | 123/520 |
| 5,967,124 | * | 10/1999 | Cook et al. | 123/520 |
| 5,974,861 | * | 11/1999 | Cook et al. | 73/40 |
| 5,987,968 | * | 11/1999 | Cook et al. | 73/49.7 |
| 6,009,746 | * | 1/2000 | Cook et al. | 73/49.7 |
| 6,016,690 | * | 1/2000 | Cook et al. | 73/49.2 |
| 6,016,691 | * | 1/2000 | Cook et al. | 73/49.7 |
| 6,016,793 | * | 1/2000 | Cook et al. | 123/520 |
| 6,044,314 | * | 3/2000 | Cook et al. | 701/31 |
| 6,050,245 | * | 4/2000 | Cook et al. | 123/520 |
| 6,053,151 | * | 4/2000 | Cook et al. | 123/520 |
| 6,073,487 | * | 6/2000 | Dawson | 73/118.1 |
| 6,089,081 | * | 7/2000 | Cook et al. | 73/118.1 |

* cited by examiner

*Primary Examiner*—Hezron Williams
*Assistant Examiner*—David J. Wiggins

(57) ABSTRACT

A module for an on-board evaporative emission leak detection system that detects leakage from an evaporative emission space of an automotive vehicle fuel system. A pump disposed within interior space of the module has an inlet in communication with the interior space and a flow passage through which the evaporative emission space is pressurized by the pump. A vent valve within the interior space is selectively operable to a first state that vents the flow passage to the interior space of the module and to a second state that does not vent the flow passage to the interior space. An electromechanical actuator within the interior space operates both the pump and the vent valve. A first lever for operating the pump is mounted for pivotal motion on a wall of the enclosure, and a second lever for operating the vent valve is mounted for pivotal motion on a wall of the enclosure. The material of the parts that provide the pivotal mountings is polymeric. An electric circuit board assembly contains electric circuitry operatively connected to the actuator and with a pressure sensor for performing a test.

21 Claims, 5 Drawing Sheets

SELF-CONTAINED LEAK DETECTION MODULE HAVING ENCLOSURE-MOUNTED TOGGLE LEVERS FOR PUMP AND VALVE

REFERENCE TO RELATED APPLICATIONS, INCORPORATION BY REFERENCE, AND PRIORITY CLAIM

This application expressly claims the benefit of earlier filing date and right of priority from the following commonly owned patent applications: U.S. Provisional Application Ser. No. 60/075,953 filed on Feb. 25, 1998 in the names of Cook et al and entitled "ELECTRIC-OPERATED, PUMP-TYPE VAPOR LEAK DETECTION MODULE"; U.S. Non-Provisional Application Ser. No. 09/065,956 filed on Apr. 24, 1998to later become U.S. Pat. No. 5,974,861 dated Nov. 2, 1999 and entitled "VAPOR LEAK DETECTION MODULE HAVING A SHARED ELECTROMAGNET COIL FOR OPERATING BOTH PUMP AND VENT VALVE"; U.S. Non-Provisional Application Ser. No. 09/065,964 filed on Apr. 24, 1998 to later become U.S. Pat. No. 5,967,124 dated Oct. 19, 1999 and entitled "VAPOR LEAK DETECTION SYSTEM HAVING A SHARED ELECTROMAGNET COIL FOR OPERATING BOTH PUMP AND VENT VALVE"; U.S. Non-Provisional Application Ser. No 09/107,517 filed on Jun. 30, 1998 to later become U.S. Pat. No. 6,016,793 dated Jan. 25, 2000 and entitled "LEAK DETECTION MODULE HAVING ELECTRIC-OPERATED TOGGLE LEVERS FOR PUMP AND VALVE"; U.S. Non-Provisional Application Ser. No. 09/107,519 filed on Jun. 30, 1998 to later become U.S. Pat. No. 6,009,746 dated Jan. 4, 2000 and entitled "ELECTRIC-OPERATED TOGGLE LEVER OF LEAK DETECTION MODULE PUMP"; and U.S. Non-Provisional Application Ser. No. 09/107,515 filed on June 30, 1998 to later become U.S. Pat. No. 6,016,691 dated Jan. 25, 2000 and entitled "CALIBRATED TOGGLE LEVER OF LEAK DETECTION MODULE PUMP". The entirety of each of those earlier-filed, co-pending patent applications is hereby expressly incorporated herein by reference.

FIELD OF THE INVENTION

This invention relates generally to a module for an on-board leak detection system that detects fuel vapor leakage from an evaporative emission space of an automotive vehicle fuel system, and more especially to an electric-operated, pump-type module for such a leak detection system.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of vapor leak detection systems for determining integrity of an evaporative emission space: a positive pressure system that performs a test by positively pressurizing an evaporative emission space; and a negative pressure (i.e. vacuum) system that performs a test by negatively pressurizing (i.e. drawing vacuum in) an evaporative emission space.

Commonly owned U.S. Pat. No. 5,146,902 discloses a positive pressure system. Commonly owned U.S. Pat. No. 5,383,437 discloses the use of a reciprocating pump to create positive pressure in the evaporative emission space. Commonly owned U.S. Pat. No. 5,474,050 embodies advantages of the pump of U.S. Pat. No. 5,383,437 while providing certain improvements in the organization and arrangement of a reciprocating pump.

The commonly assigned applications identified above relate to novel leak detection modules containing electric-operated pumping mechanisms and vent valves.

SUMMARY OF THE INVENTION

One general aspect of the invention relates to further improvements in the leak detection modules of the general type disclosed in the above-identified applications.

Another general aspect relates to a module for an on-board evaporative emission leak detection system that detects leakage from an evaporative emission space of a fuel system of an automotive vehicle, the module comprising: a walled enclosure comprising an interior space adapted to be communicated to atmosphere; a pump disposed within the interior space comprising a pumping chamber having an inlet in communication with the interior space and a flow passage for communicating the pumping chamber with an evaporative emission space to allow the evaporative emission space to be pressurized by the pump; a vent valve that is disposed within the interior space and is selectively operable to a first state that vents the flow passage to the interior space to thereby vent the evaporative emission space to atmosphere and to a second state that does not vent the flow passage to the interior space; and an electrio-operated actuator mechanism disposed within the interior space for operating the pump and the vent valve to perform a leak test on the evaporative emission space; the actuator mechanism comprising a coupling through which one of the pump and the vent valve is operated, the coupling comprising a lever that has first and second lever arms and comprises a part having a formation that is proximate proximal ends of the first and second lever arms and is received in a complementary formation in a wall of the enclosure to thereby pivotally mount the lever on the wall of the enclosure.

Still another general aspect of the invention relates to an on-board evaporative emission leak detection system that detects leakage from an evaporative emission space of a fuel system of an automotive vehicle and that comprises: a pump for creating in the evaporative emission space a pressure condition suitable for performing a leak test; a vent valve that is selectively operable to a first state for venting the evaporative emission space to atmosphere and to a second state for closing the evaporative emission space to atmosphere; and an electric-operated actuator mechanism for operating at least one of the pump and the vent valve to perform a leak test on the evaporative emission space; the actuator mechanism comprising a coupling through which one of the pump and the vent valve is operated, the coupling comprising a lever that has first and second lever arms and comprises a non-metallic part having a formation that is proximate proximal ends of the first and second lever arms and is received within a complementary formation of a non-metallic mounting to thereby pivotally mount the lever for rocking motion to operate the one of the pump and the vent valve.

Still another general aspect of the invention relates to a module for an on-board evaporative emission leak detection system that detects leakage from an evaporative emission space of a fuel system of an automotive vehicle, the module comprising: a walled enclosure comprising an interior space adapted to be communicated to atmosphere; a pump disposed within the interior space comprising a pumping chamber having an inlet in communication with the interior space and a flow passage for communicating the pumping chamber with an evaporative emission space to allow the evaporative emission space to be pressurized by the pump; a vent valve that is disposed within the interior space and is selectively operable to a first state that vents the flow passage to the interior space to thereby vent the evaporative emission space to atmosphere and to a second state that does not vent the flow passage to the interior space; an electric-operated actuator mechanism disposed within the interior space for operating the pump and closing the vent valve to perform a leak test on the evaporative emission space; a pressure sensor for sensing pressure in the flow passage; and an electric circuit board assembly containing electric circuitry operatively connected to both the electric-operated actuator mechanism and the pressure sensor.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
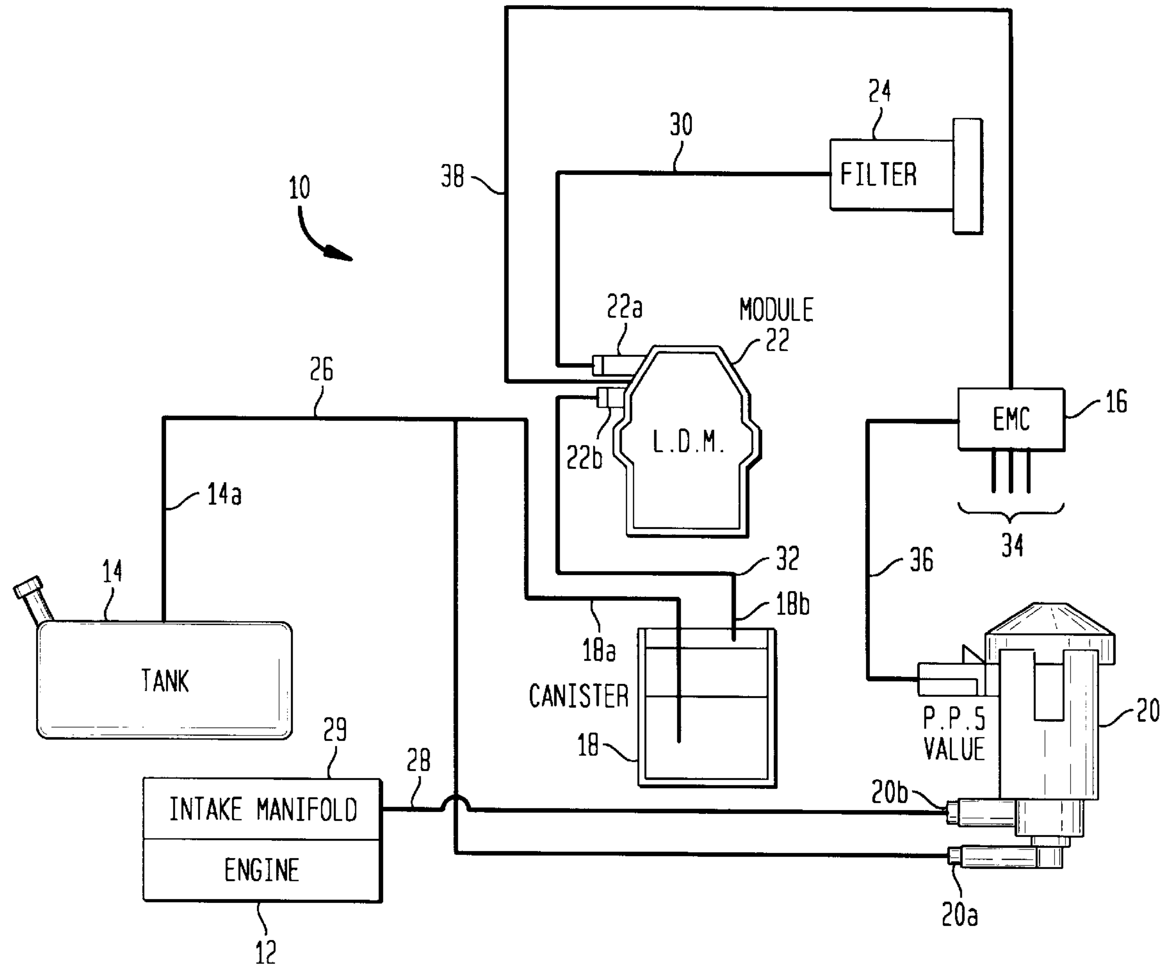
FIG. 1 is a general schematic diagram of an exemplary automotive vehicle evaporative emission control system including a leak detection system and module embodying principles of the invention.

FIG. 1 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, a leak detection module (LDM) 22, and a particulate filter 24. In the illustrated schematic, module 22 and canister 18 are portrayed as discrete components, but they could alternatively be integrated into one assembly.

A tank headspace port 14*a* that communicates with headspace of fuel tank 14, a tank port 18*a* of canister 18, and an inlet port 20*a* of PPS valve 20 are placed in common fluid communication by a conduit 26. Another conduit 28 fluid-connects an outlet port 20*b* of PPS valve 20 with an intake manifold 29 of engine 12. Another conduit 30 fluid-connects a port 22*a* of module 22 to atmosphere via filter 24. Another conduit 32 fluid-connects a port 22*b* of module 22 with a vent port 18*b* of canister 18. Headspace of tank 14, canister 18, and associated conduits collectively define evaporative emission space within which fuel vapors generated by volatilization of fuel in tank 14 are temporarily confined and collected until purged to intake manifold 29 via opening of PPS valve 20.

EMC 16 receives a number of inputs, collectively designated 34, (engine-related parameters for example) relevant to control of certain operations of engine 12 and its associated systems, including EEC system 10. One electrical output port of EMC 16 controls PPS valve 20 via an electrical connection 36; other ports of EMC 16 are coupled with module 22 via electrical connections, depicted generally by the reference numeral 38.

From time to time, EMC 16 commands module 22 to an active state as part of an occasional leak detection test procedure for ascertaining the integrity of EEC system 10, particularly the evaporative emission space that contains volatile fuel vapors, against leakage. During occurrences of such a diagnostic procedure, EMC 16 commands PPS valve 20 to close. At times of engine running other than during such leak detection procedures, module 22 reposes in an inactive state, and in doing so provides an open vent path from the evaporative emission space, through itself and filter 24, to atmosphere. A vapor adsorptive medium within canister 18 prevents escape of fuel vapor to atmosphere during such venting.

EMC 16 selectively operates PPS valve 20 such that the valve opens under conditions conducive to purging and closes under conditions not conducive to purging. Thus, during times of operation of the automotive vehicle, the canister purge function is performed in a manner suitable for the particular vehicle and engine so long as the leak detection test procedure is not being performed. When the leak detection test procedure is being performed, the canister purge function is not performed. During a leak detection test, the evaporative emission space is isolated from both atmosphere and the engine intake manifold so that it can be initially positively pressurized by module 22, and the pressure thereafter allowed to decay if leakage is present.

Figure 2:
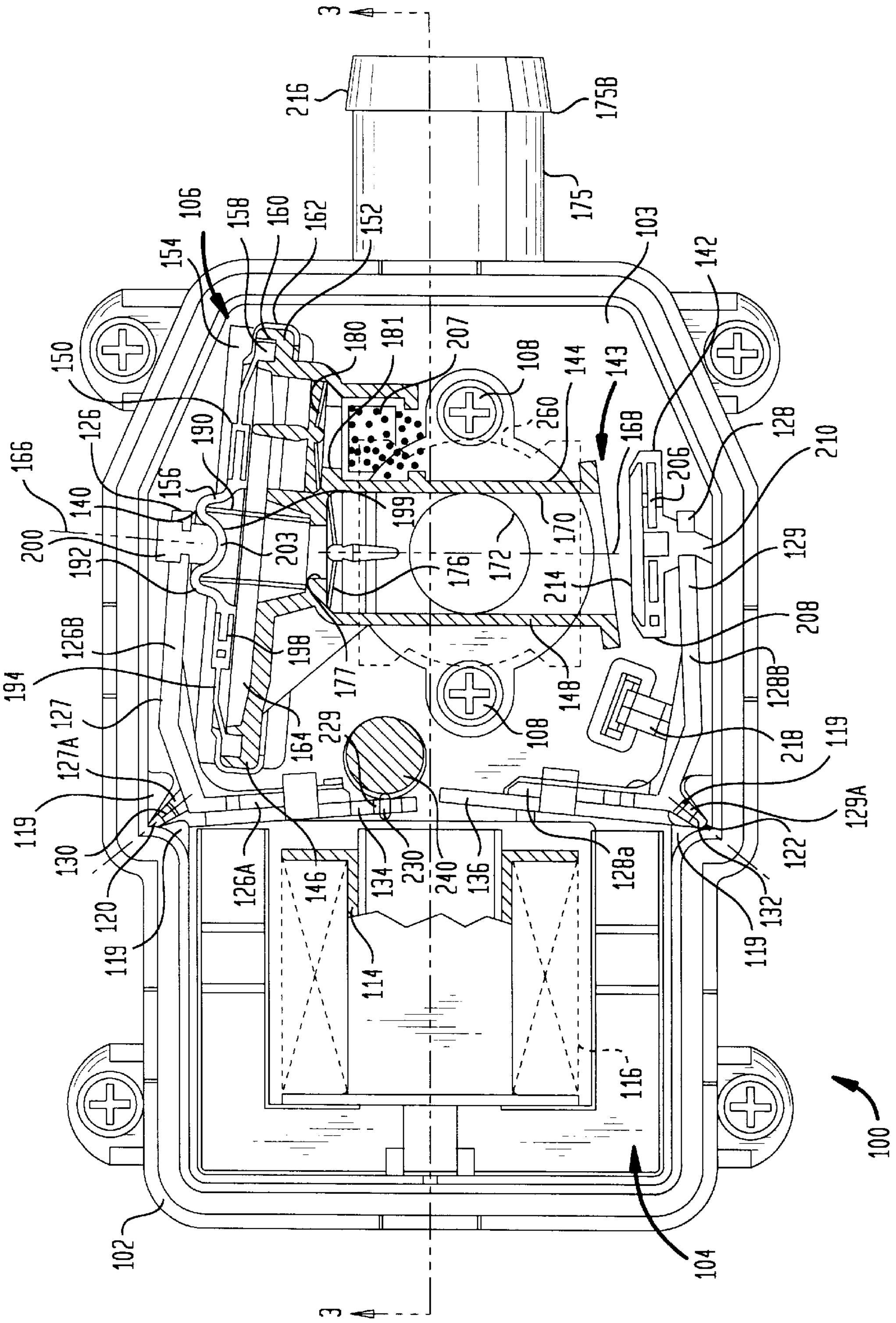
FIG. 2 is a plan view showing the interior of a first embodiment of module.

FIG. 2 discloses a module 100 comprising a walled enclosure 102 that has been opened to reveal the contents of its interior space 103. An electromagnet assembly 104 and a pump assembly 106 are disposed within interior space 103. Each assembly is securely mounted in any suitably appropriate fashion, such as illustrated in the case of the latter assembly by fastening it to an enclosure wall using screws 108 passing through apertured tabs of the assembly.

Electromagnet assembly 104 comprises an organization and arrangement that is effective to operate pump assembly 106 in the same manner as described in the above referenced pending patent applications. Electromagnet assembly 104 further comprises a plastic bobbin 114 containing an electromagnet coil 116 and a pair of electric terminals 118 (see FIG. 3) for connecting coil 116 with an electric circuit for operating assembly 104.

Enclosure 102 comprises two pairs of formations 119 that provide respective pivot bearings 120, 122 for the pivots of respective levers 126, 128 to pivot about respective parallel axes 130, 132 that are perpendicular to the plane of FIG. 2. Formations 119 are integrally formed in the enclosure as ridges that run perpendicular to the plane of FIG. 2. The two formations of each pair cooperate to define the corresponding pivot bearing as a V-shaped groove, or channel, between the two ridges.

Each lever 126, 128 is an assembly of several individual parts and may be considered to have two lever arms that are disposed at approximately right angles to one another. A part 127 of lever 126 comprises lever arms 126*a*, 126*b*, and a part 129 of lever 128, lever arms 128*a*, 128*b*. Proximate the proximal ends of its two lever arms, each part 127, 129 comprises a formation 127*a*, 129*a*, that is received in the respective pivot bearing 120, 122 such that the free end edge of each formation is coincident with the respective axis 130, 132.

Each part 127, 129 is non-ferromagnetic and non-metallic, such as a plastic (i.e. polymeric) extrusion or a plastic injection molding. Materials suitable for these parts should possess durability and dimensional stability. An example of a suitable material is a glass-filled nylon, and an example of a suitable process is making the parts by injection molding the parts as individual parts. For enabling each lever to be operated by electromagnet assembly 104, a respective ferromagnetic part, or slug, 134, 136 is attached to, and forms a portion of, the respective lever arm 126*a*, 128*a* so as to be disposed proximate the juxtaposed axial end of the coil and bobbin. Each part 134, 136 has a double bend retention formation that comprises, at a free end, a tab, such as tab 136*t* in the case of part 136, which can be inserted through a slot in the respective non-metallic part 127, 129 near the proximal end of the respective lever arm 126*a*, 128*a*. The process for assembling each part to the respective lever arm comprises: aligning the end of the respective tab with the respective slot; inserting the respective tab into the respective slot; and then manipulating the respective part, generally by swinging it about the mutually associated slot and tab while advancing the first bend in the double bend in the retention formation, to finally place portions of the part and lever arm that are immediately adjacent the slot and double bend formation in face-to-face abutment as shown in FIG. 2. Then retaining tabs that project from opposite edges of the parts , such as retaining tabs 136*r* in the case of part 136, are crimped to, i.e. bent over, around, and against, respective edge margins of the respective lever arm to complete the assembly of the ferromagnetic part to the non-ferromagnetic lever arm.

The distal ends of lever arms 126*b*, 128*b* are operatively associated with pump assembly 106. The distal end of lever arm 126*b* is operatively coupled to a pumping mechanism 140 of pump assembly 106. The distal end of lever arm 128*b* carries a closure 142 that selectively associates with and disassociates from pump assembly 106 to form a vent valve 143.

Figure 3:
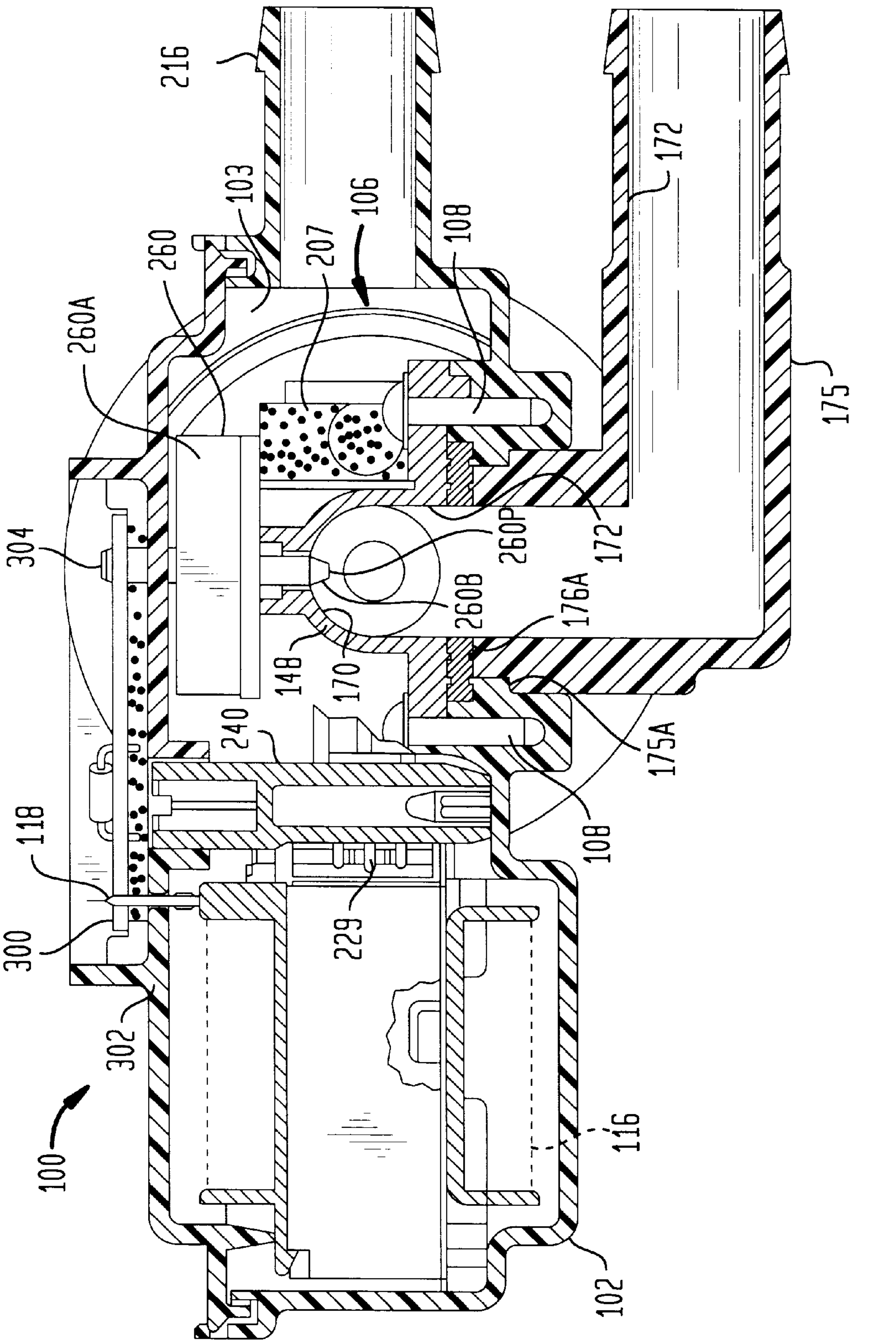
FIG. 3 is cross section view along line 3–3 in FIG. 2.

As shown by FIGS. 2 and 3, pump assembly 106 comprises a housing 144 that is mounted on enclosure 102 by screws 108 passing through apertured tabs at the sides of the housing base and threading into the wall of enclosure 102. Pumping mechanism 140 is disposed at one end of housing 144, and that end comprises a circular flange 146. Housing 144 further comprises a tubular wall 148 extending from flange 146 to an opposite end of the housing.

Pumping mechanism 140 comprises a movable wall 150 having a circular perimeter margin disposed against a rim 152 of flange 146. Wall 150 is shown to comprise a flexible, but fluid-impermeable, part 154 and a rigid part 156, stamped metal for example. Part 154 is a fuel-tolerant elastomeric material that is molded to part 156 by known insert-molding methods, thereby intimately uniting the two parts 154, 156 into an assembly along a circular fluid-tight joint. The outer perimeter margin of movable wall 150 comprises a circular bead 158 in part 154. Rim 152 comprises a circular groove 160 within which bead 158 is disposed. Bead 158 is held in groove 160 by a circular clinch ring 162 which is fitted over the abutted perimeter margins of wall 150 and flange 146 and which has an outer perimeter that is deformed and crimped onto the abutted perimeter margins of wall 150 and flange 146 in the manner shown. This serves to seal the two perimeter margins together so that a pumping chamber 164 is cooperatively defined by wall 150 and flange 146.

Pumping chamber 164 may be considered to have an axis 166 that is concentric with flange 146 and wall 150. Axis 166 is offset from an axis 168 of tubular wall 148. Tubular wall 148 comprises a passage 170 extending along axis 168 from pumping chamber 164 and opening to the interior space 103 of enclosure 102 at the end of housing 144 opposite pumping chamber 164. Intermediate its opposite ends, passage 170 is intersected by a canister passage 172 that is adapted to be placed in communication with canister 18. A short segment of the length of canister passage 172 is formed in housing 144, extending from passage 170. One end of an elbow 175 is fit to a hole in the wall of enclosure 102 where an annular seal 176*a* both seals the elbow from interior space 103 and seals around canister passage 172 where the elbow forms a continuation of the canister passage that extends from housing 144. Elbow 175 has an external nipple 175*b* that forms port 22*b* and is available for association with conduit 32.

A one-way valve 176 is disposed between pumping chamber 164 and passage 170 to allow fluid flow in a direction from pumping chamber 164 into passage 170, but not in an opposite direction. Valve 176 comprises an elastomeric umbrella valve element mounted on housing 144 in covering relation to a hole 177 in a wall between pumping chamber 164 and passage 170. Spaced from valve 176 circumferentially about axis 166 is a second one-way valve 180 comprising an umbrella valve element disposed in covering relation to a hole 181. Valve 180 has a construction like that of valve 176, but its umbrella valve element is disposed to allow fluid flow through hole 181 in a direction from interior space 103 into pumping chamber 164, but not in an opposite direction. A filter element 207 is disposed at the pumping chamber entrance just upstream of valve 180 to filter certain particulate material from air that may have entered interior space 103 so that such material is prevented from being sucked into the air pumping mechanism.

The wall portion of housing 144 surrounding hole 177 comprises a depression that forms a seat for one axial end of a helical coil spring 190. Part 156 has a central tower 192 seating the opposite axial end of spring 190.

Part 154 comprises an annulus 194 whose outside diameter (O.D.) joins with bead 158. The inside diameter (I.D.)

of annulus 194 is molded onto the free edge of a flange 198 of part 156 at the base of tower 192.

The end wall of tower 192 contains a central dimple 199. A grommet-like part 200 is mounted on the distal end of lever arm 126*b*, and comprises a bulk of molded elastomeric material forming a button 203 having a rounded end that seats in dimple 199 on the exterior of the pumping chamber. Part 200 also has a grooved stem extending from button 203 to pass through a hole in the distal end of the lever arm, seating the part thereon. FIG. 2 shows spring 190 resiliently biasing movable wall 150 in a direction axially away from pumping chamber 164 to cause lever 126 to be pivoted maximally counterclockwise about axis 130 via the action of dimple 199 on part 200.

Closure 142 comprises a rigid disk 206, stamped metal for example, onto which elastomeric material 208 has been insert molded so that the two are intimately united to form an assembly. The elastomeric material forms a grommet-like post 210 that projects perpendicularly away from, and to one axial side of, the center of disk 206. Post 210 comprises an axially central groove providing for the attachment of closure 142 to the distal end of lever arm 128*b* in the same manner as the attachment of lever arm part 200 to lever 126. At the outer margin of disk 206, the elastomeric material is formed to provide a lip seal 214 that is generally frustoconically shaped and canted inward and away from disk 206 on the axial side of the disk opposite post 210.

Enclosure 102 comprises a second nipple 216 that forms port 22*a* and is available on the enclosure exterior for association with conduit 30. This provides for interior space 103 to be continuously vented to atmosphere through filter 24.

The positions of the various parts of module 100 shown in FIG. 2 represent a condition where module 100 is in its inactive state. In that state, lever 128 is biased clockwise about axis 132 by a spring 218 to cause closure 142 to be spaced apart from housing 144, thereby holding vent valve 143 open. Consequently, the evaporative emission space is vented to atmosphere through a vent path comprising conduit 32, passage 172, passage 170, interior space 103, conduit 30, and filter 24. When a leak detection test is to be performed, EMC 16 operates module 100 to an active state, and PPS valve 20, closed.

In the active state of module 100, coil 116 is energized by a driver circuit to pivot lever 128 counterclockwise from the position shown in FIG. 2, thereby swinging closure 142 over a small acute angle about axis 132 to seal the open end of passage 170 closed due to the action of lip seal 214 with the end surface of housing 144 around passage 170. Consequently, the evaporative emission space under test is no longer vented to atmosphere because the vent path through vent valve 143 has now been closed. The electric current supplied to coil 116 by the driver circuit may be considered to comprise a first component that causes electromagnet assembly 104 to exert a force on lever arm 128*a* that, in conjunction with the force vs. deflection characteristic of spring 218, the inertial mass pivotally mounted about axis 132, and the pressure differential acting on closure 142, maintains closure 142 sealed closed against the end surface of housing 144 around passage 170 while module 100 continues to be in its active state.

The electric current supplied to coil 116 may be considered to also comprise a second component that is effective to cause electromagnet assembly 104 to oscillate, or toggle, lever 126 during the active state of module 100, and thereby operate pumping mechanism 140, while the vent path to atmosphere remains closed. Movable wall 150 executes a pumping stroke, or downstroke, as lever 126 pivots clockwise about axis 130 from the position shown in FIG. 1, due to attraction of ferromagnetic part 134 and the resulting motion of lever arm 126*a* toward coil 116. Such stroking causes a charge of air that is in pumping chamber 164 to be compressed, and thence a portion of the compressed charge expelled through valve 176, into passage 170, into passage 172, and ultimately into the evaporative emission space being tested. The pump downstroke is limited by abutment of a snubber device 229 at the distal end of part 134 with electromagnet assembly 104, and when that occurs, the consequent lack of further compression of the air charge prevents valve 176 from remaining open.

Snubber device 229 has snubbers 230 protruding from opposite faces of part 134 for snubbing the oscillatory motion of lever 126 both upon impact with electromagnet 104 when the lever swings toward electromagnet 104 and upon impact with a stop 240 when the lever swings away from electromagnet 104. The constructions and functions of both snubber device 229 and stop 240 are the same as disclosed in Ser. No. 09/107,515, incorporated by reference herein.

Electromagnet assembly 104 then releases part 134, and the action of spring 190 causes movable wall 150 to execute a charging stroke, or upstroke, in a direction away from pumping chamber 164. During the upstroke, valve 176 remains closed, but a pressure differential across valve 180 causes the latter valve to open. Now atmospheric air from interior space 103 can enter pumping chamber 164 through valve 180. The end of the upstroke occurs when snubber device 229 abuts stop 240, at which time a charge of air has once again been created in pumping chamber 164. At that time, valve 180 closes due to lack of sufficient pressure differential to maintain it open. Pumping mechanism 140 is then once again downstroked to commence the next pumping stroke wherein a charge of air is compressed, and a portion of the compressed charge is forced into the evaporative emission space.

Pumping mechanism 140 is repeatedly stroked in this manner until pressure suitable for performing a leak detection test has been created in the evaporative emission space under test. The component of electric current in coil 116 that oscillates, or reciprocally swings, lever 126 has a pulsing, or oscillating, characteristic that is chosen in relation to the inertial mass that is pivoted about axis 130 and the operating characteristic of spring 190 such that pumping mechanism 140 can follow the oscillating, or pulsing, current component. Hence, spring 190 is much stiffer than spring 218.

An electric circuit for operating assembly 104 is contained on an electric circuit board 300 that is disposed in a receptacle space formed in a wall 302 of a cover that forms a part of enclosure 102. A portion of the electric circuit comprises the driver circuit that operates electromagnet 104 by delivering electric current, as described earlier, via terminals 118 that have conductive contact with the driver circuit. A pressure sensor, or switch, 260 has a body 260*a* disposed within enclosure 102 and a nipple 260*b* comprising a sensing port 260*p* communicated to passage 170 to sense pressure in the evaporative emission space under test. It also has a reference port (not specifically shown) communicated to interior space 103 of enclosure 102 to provide an atmospheric reference pressure with respect to which the sensed pressure in the evaporative emission space under test is referenced. Electric terminals, 304 generally, extend from body 260*a* and through suitable apertures in the cover wall of enclosure 102 to make electric contact with a corresponding portion of the circuit on board 300 so that sensed pressure signals are made available to the circuit for operating module 100. Analog and digital sensors are believed suitable for the pressure sensor, and examples of suitable devices are a Motorola 5100 Series Sensor and an MPL (MicroPneumatic Logic) 500 Series Switch. Once pressure suitable for performing a leak detection test has been created in the evaporative emission space under test, a suitable procedure for obtaining a leakage measurement may be may be employed while vent valve 143 and PPS valve 20 remain closed.

The presence of leakage may be detected by sensing loss of pressure in the evaporative emission space under test using pressure sensor, or switch, 260. The sensor, or switch, may define a switch point corresponding to a pressure suitable for performing a test. When the pressure rises to the switch point, pumping mechanism 140 may be operated in a controlled manner to increase the pressure slightly higher. The controlled manner of operation may be time-based or pulse-based. Pumping mechanism 140 may be stroked a certain number of times and then stopped, remaining stopped until the pressure sensed by the sensor drops to the switch point. For example, twenty strokes at a twenty cycle per second stroke rate would require one second. When the pressure returns to the switch point, the pumping mechanism is again stroked and stopped in the same manner as before to again slightly increase the pressure.

For a stable leak, the testing will stabilize at a condition where pumping mechanism 140 will be stroked at fairly regular intervals. The durations of these intervals between successive strokings of the pumping mechanism are indications of the effective leak size. The larger the leak, the smaller the intervals, and vice versa. Once the intervals have substantially stabilized, they may be averaged to yield a leak measurement. At the conclusion of the test, module 100 is returned to its inactive state by terminating electric current flow to coil 116. At that time lever 128 swings back to the position shown by FIG. 2.

Figure 4:
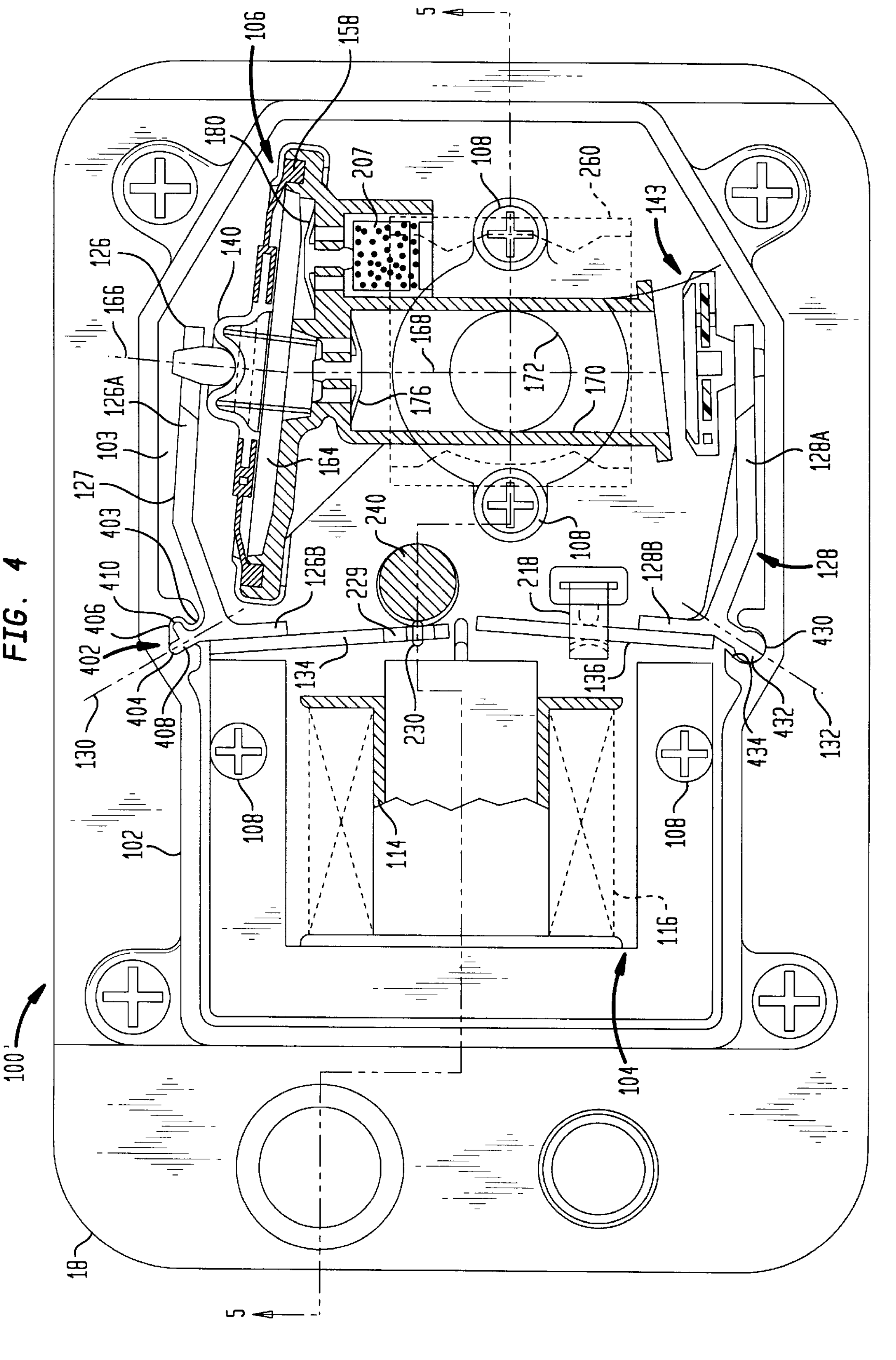
FIG. 4 is a plan view showing the interior of a second embodiment of module mounted atop a canister.
Figure 5:
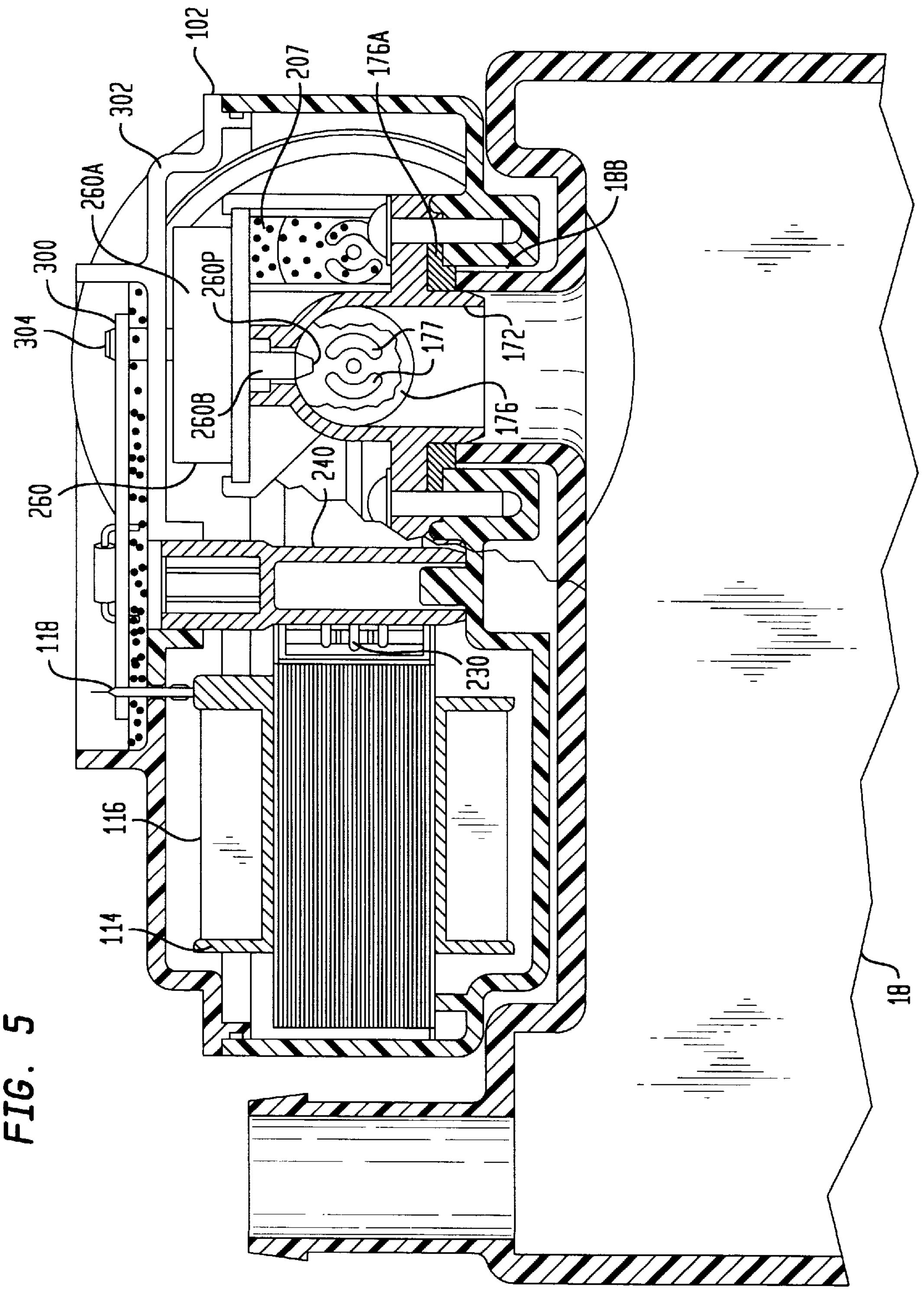
FIG. 5 is a cross section view in the direction of arrows 5—5 in FIG. 4.

FIGS. 4 and 5 disclose another embodiment of module 100' that is like module 100 except for several differences. Reference numerals used in FIGS. 4 and 5 designate the same parts as corresponding numerals in FIGS. 1–3.

Module 100' differs in that its enclosure 102 is shaped for mounting atop vapor collection canister 18, and it omits elbow 175. Hence, seal 176*a* seals the end of passageway 172 directly to canister port 18*b*.

Another difference involves valves 176, 180 and their mountings on the pump housing. While comparison of FIGS. 2 and 3 with FIGS. 4 and 5 shows their construction details differing in certain respects, it can be appreciated that the air pumping mechanisms and the associated check valves still function in the same manner as described for FIGS. 2 and 3.

Still another difference resides in the details of the interaction of spring 218 with lever 128. In module 100', spring 218 acts on the opposite lever arm portion, as compared to module 100, but still functions to impart bias in the same clockwise sense as in module 100.

Other differences relate to the constructions of levers 126, 128 and their pivotal mountings on enclosure 102. Part 127 of lever 126 comprises lever arms 126*a* and 126*b*. Lever arm 126*a* is essentially like its counterpart in module 100, but lever arm 126*b* is somewhat shorter than its counterpart. A proximal end portion of a ferromagnetic part 134 is fastened in any suitably appropriate manner to lever arm 126*b*, effectively extending its length. A wall of enclosure 102 comprises a straight channel 402 whose length is perpendicular to the plane of FIG. 4. Channel 402 has a transverse cross sectional shape as illustrated, being approximately triangular and narrowing at its apex to a throat 403 which opens to interior space 103 of enclosure 102. Two corners 404, 406 at the base of the triangular cross section are rounded, and one corner 404 provides a pivot bearing for a rounded end edge of a formation 408 of part 127 that extends from the proximal ends of lever arms 126*a*, 126*b*. Another formation 410, also having a rounded end edge, makes approximately a right angle with formation 408. Formation 410 is dimensioned not to interfere with toggling of lever 126, but it presents a potential dimensional interference to a curved end of a side of channel 402 that extends between corner 406 and throat 403. After the lever has been operatively associated with channel 402 during assembly of module 100' by first aligning formations 408, 410 with channel 402 and then inserting them lengthwise into the channel, the potential dimensional interference with the channel wall provided by formation 410 serves to prevent the lever from coming out of the channel when the module operates. Part 127 can be fabricated in any of the same ways previously described for its counterpart in module 100.

Part 129 of lever 128 of module 100' is also generally similar to its counterpart in module 100. Lever arm 128*b* is somewhat shorter than its counterpart, and a proximal end portion of a ferromagnetic part 136 is fastened in any suitably appropriate manner to lever arm 128*b*, effectively extending its length. Part 129 has a formation 430 that, as viewed endwise in FIG. 4, extends from the proximal ends of lever arms 128*a*, 128*b* to terminate in an enlargement 432 having a rounded end edge providing a pivot bearing for the lever. A wall of enclosure 102 has a somewhat circular-shaped channel 434 within which enlargement 432 is disposed. The radius of channel 434 is larger than that of the rounded end surface of enlargement 432 so that bearing contact occurs along a line edge. Lever 128 is operatively associated with channel 434 during assembly of module 100' by first aligning enlargement 432 with channel 434 and then inserting the enlargement lengthwise into the channel. Channel 434 opens to interior space 103 via a throat. A neck of formation 430 passes through the channel throat, and the relative dimensions of the enlargement and the neck are such that the enlargement is contained within the channel as the lever toggles.

While each lever of module 100' has a different type of formation, it should be appreciated that any particular module may use either type for either lever, in conjunction with an appropriate channel in the enclosure wall. One manner of assembling each ferromagnetic part to its respective lever arm is shown by FIG. 4 where each ferromagnetic part is provided with one or more through-holes and the respective plastic part is insert-molded to the respective ferromagnetic part as the plastic part is itself being fabricated. Each through-hole has a shape, such as a counterbore, that allows plastic material to flow through, and upon curing, interlock with the through-hole.

Advantages of fabricating portions of the described levers of the two modules from polymeric material are that the mass can be reduced in comparison to the use of metal, that the channels for mounting the levers can be integrated into the enclosure, and assembly procedures are facilitated. A material for enclosure 102 should, like that of the levers, possess dimensional stability. A mineral-filled nylon is one example of a suitable enclosure material.

Both FIGS. 3 and 5 show detail of association of circuit board assembly 300, stop 240, electromagnet coil 116, and sensor 260 with enclosure 102. Enclosure 102 may be considered to comprise a base 102*b* and a cover 102*c* that close together along respective perimeters. The enclosure has a shape for accommodating the various internal components. Circuit board assembly 300 is shown disposed within a shallow, rimmed pocket on the exterior of cover 102*c*. Suitable through-holes are present in the cover to allow terminals 118 and 304 to pass from coil 116 and sensor 260 respectively through the enclosure wall to circuit board assembly 300. A short, upright bearing post 102*p* is provided on the bottom wall of base 102*b* and fits into a hole in an end of stop 240. A shouldered hole 102*h* in the wall of cover 102*c* provides a bearing for the opposite end of stop 240. In a completed module, the circuit board assembly 300 may be encapsulated, or potted, in suitable encapsulating, or potting, material.

For enabling the circuitry on circuit board assembly 300 to be operatively associated with an electrical system of an automotive vehicle, an electric connector containing a number of electric terminals is provided on the circuit board assembly. Although it does not specifically appear in FIG. 3 or 5 because it is forward of the respective cross section through the respective module where the view is taken, the electric connector projects from the plane of the Figure toward the reader.

While specific circuitry on circuit board assembly 300 may depend on a particular automotive vehicle manufacturer's requirements, the present invention contemplates several generic forms for such circuitry. In one form, the circuitry may be only driver circuits that are under the control of EMC 16 for operating electromagnet assembly 104 and pump assembly 106. Signals from sensor 260 may be amplified by amplifier circuitry on circuit board assembly 300 for transmission to, and ensuing processing by, EMC 16. In another form, the circuitry on circuit board assembly 300 may comprise devices, including a microprocessor containing algorithms, for performing complete leak detection testing. Such testing may be initiated at certain times by EMC 16, and after a self-contained test has been completed, the test result may be read by, or furnished to, EMC 16. Hence, in this latter form, the modules may be referred to as "smart" modules because they are capable of performing complete leak testing by themselves.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A module for an on-board evaporative emission leak detection system that detects leakage from an evaporative emission space of a fuel system of an automotive vehicle, the module comprising:

a walled enclosure comprising an interior space adapted to be communicated to atmosphere;

a pump disposed within the interior space comprising a pumping chamber having an inlet in communication with the interior space and a flow passage for communicating the pumping chamber with an evaporative emission space to allow the evaporative emission space to be pressurized by the pump;

a vent valve that is disposed within the interior space and is selectively operable to a first state that vents the flow passage to the interior space to thereby vent the evaporative emission space to atmosphere and to a second state that does not vent the flow passage to the interior space; and an electric-operated actuator mechanism disposed within the interior space for operating the pump and the vent valve to perform a leak test on the evaporative emission space;

the actuator mechanism comprising a coupling through which one of the pump and the vent valve is operated, the coupling comprising a lever that has first and second lever arms and comprises a part having a formation that is proximate proximal ends of the first and second lever arms and is received in a complementary formation in a wall of the enclosure to thereby pivotally mount the lever on the wall of the enclosure.

2. A module as set forth in claim 1 in which the part comprises non-metallic material and the complementary formation in the wall of the enclosure also comprises non-metallic material.

3. A module as set forth in claim 2 in which the complementary formation in the wall of the enclosure comprises a channel that opens to the interior space of the enclosure.

4. A module as set forth in claim 3 in which the channel, as viewed in transverse cross section, comprises a polygonal shape having a rounded corner, and the formation of the part, as viewed in transverse cross section, comprises a rounded edge that bears on the rounded corner of the channel.

5. A module as set forth in claim 4 in which the part has a second formation disposed within the channel to provide a dimensional interference with the channel that prevents removal of both formations from the channel through a throat via which the channel opens to the interior space of the enclosure.

6. A module as set forth in claim 3 in which the channel, as viewed in transverse cross section, comprises a concave wall that opens via a throat to the interior space of the channel, and the formation in the part, as viewed in transverse cross section, comprises an enlargement that is disposed within the rounded wall of the channel and has a rounded surface bearing against the rounded wall of the channel, and a neck that extends from the enlargement and passes through the channel throat.

7. A module as set forth in claim 6 in which the throat of the channel is dimensioned to provide an interference with the enlargement that prevents removal of the enlargement from the channel via the throat.

8. A module as set forth in claim 1 in which the part comprises non-metallic material and forms at least a portion of each of the first and second lever arms, and one of the first and second lever arms further includes a ferromagnetic part fastened to the non-metallic material of the one lever arm.

9. A module as set forth in claim 1 in which the coupling operates the pump.

10. A module as set forth in claim 1 in which the coupling operates the vent valve.

11. An on-board evaporative emission leak detection system that detects leakage from an evaporative emission space of a fuel system of an automotive vehicle and that comprises:

a pump for creating in the evaporative emission space a pressure condition suitable for performing a leak test;

a vent valve that is selectively operable to a first state for venting the evaporative emission space to atmosphere and to a second state for closing the evaporative emission space to atmosphere; and an electric-operated actuator mechanism for operating at least one of the pump and the vent valve to perform a leak test on the evaporative emission space; the actuator mechanism comprising a coupling through which one of the pump and the vent valve is operated, the coupling comprising a lever that has first and second lever arms and comprises a non-metallic part having a formation that is proximate proximal ends of the first and second lever arms and is received within a complementary formation of a non-metallic mounting to thereby pivotally mount the lever for rocking motion to operate the one of the pump and the vent valve.

12. A system as set forth in claim 11 in which the complementary formation in the mounting comprises a channel.

13. A module as set forth in claim 12 in which the channel, as viewed in transverse cross section, comprises a polygonal shape having a rounded corner, and the formation of the part, as viewed in transverse cross section, comprises a rounded edge that bears on the rounded corner of the channel.

14. A module as set forth in claim 13 in which the part has a second formation disposed within the channel to provide a dimensional interference with the channel that prevents removal of both formations from the channel through a throat of the channel.

15. A module as set forth in claim 12 in which the channel, as viewed in transverse cross section, comprises a concave wall having a throat, and the formation in the part, as viewed in transverse cross section, comprises an enlargement that is disposed within the rounded wall of the channel and has a rounded surface bearing against the rounded wall of the channel, and a neck that extends from the enlargement and passes through the channel throat.

16. A module as set forth in claim 15 in which the throat of the channel is dimensioned to provide an interference with the enlargement that prevents removal of the enlargement from the channel via the throat.

17. A module as set forth in claim 11 in which the part forms at least a portion of each of the first and second lever arms, and one of the first and second lever arms further includes a ferromagnetic part fastened to the non-metallic material of the one lever arm.

18. A module as set forth in claim 11 in which the coupling operates the pump.

19. A module as set forth in claim 11 in which the coupling operates the vent valve.

20. A module for an on-board evaporative emission leak detection system that detects leakage from an evaporative emission space of a fuel system of an automotive vehicle, the module comprising:

a walled enclosure comprising an interior space adapted to be communicated to atmosphere;

a pump disposed within the interior space comprising a pumping chamber having an inlet in communication with the interior space and a flow passage for communicating the pumping chamber with an evaporative emission space to allow the evaporative emission space to be pressurized by the pump;

a vent valve that is disposed within the interior space and is selectively operable to a first state that vents the flow passage to the interior space to thereby vent the evaporative emission space to atmosphere and to a second state that does not vent the flow passage to the interior space;

an electric-operated actuator mechanism disposed within the interior space for operating the pump and closing the vent valve to perform a leak test on the evaporative emission space;

a pressure sensor for sensing pressure in the flow passage; and an electric circuit board assembly containing electric circuitry operatively connected to both the electric-operated actuator mechanism and the pressure sensor.

21. A module as set forth in claim 20 in which the electric circuit board assembly comprises a microprocessor that contains an algorithm for operating the actuator mechanism and for processing pressure information from the pressure sensor to perform a complete test.

* * * * *